Dec. 2, 1958 G. B. HIRSCH 2,862,422
MILLING MACHINES
Filed Nov. 24, 1953 8 Sheets-Sheet 1

Inventor:
George B. Hirsch,
by Maxwell Fish
Attorney

Dec. 2, 1958  G. B. HIRSCH  2,862,422
MILLING MACHINES

Filed Nov. 24, 1953  8 Sheets-Sheet 4

Inventor:
George B. Hirsch,
by Maxwell Fish
Attorney

Dec. 2, 1958  G. B. HIRSCH  2,862,422
MILLING MACHINES

Filed Nov. 24, 1953  8 Sheets-Sheet 6

Inventor:
George B. Hirsch
by Maxwell Fish
Attorney

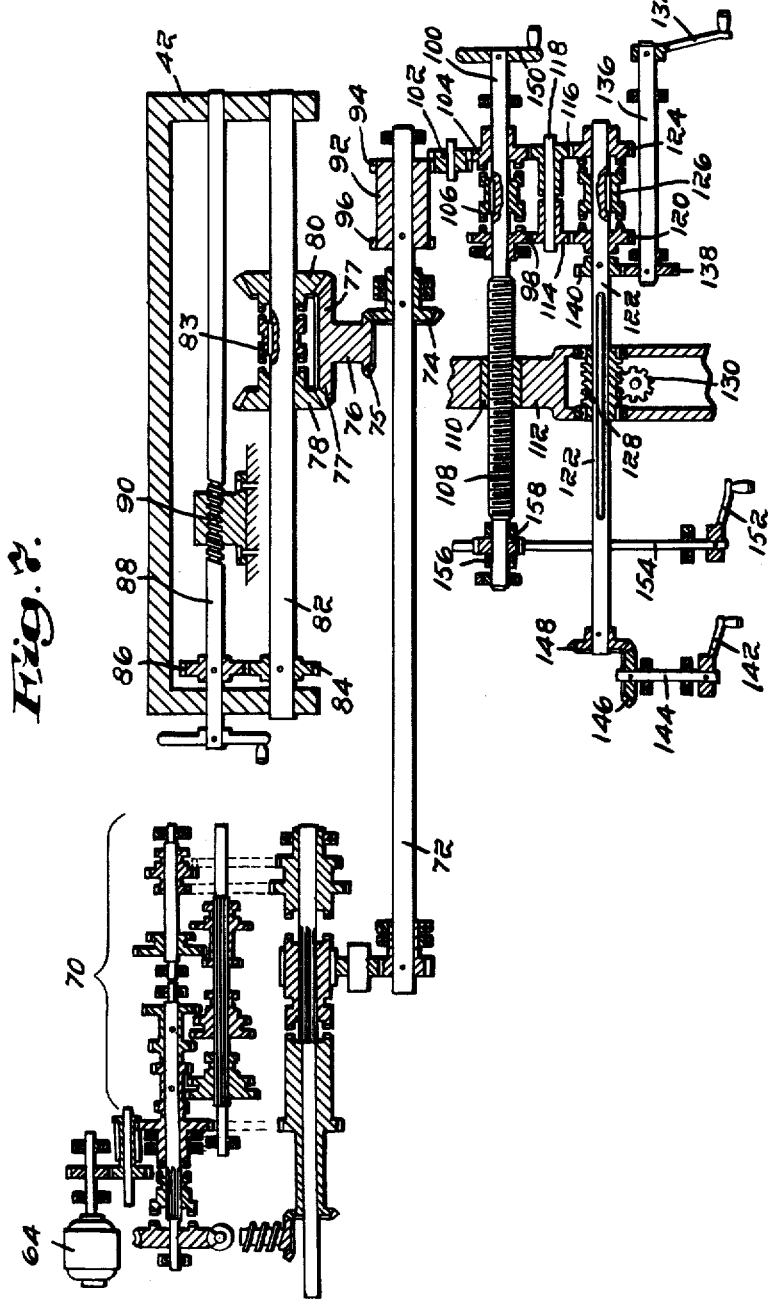

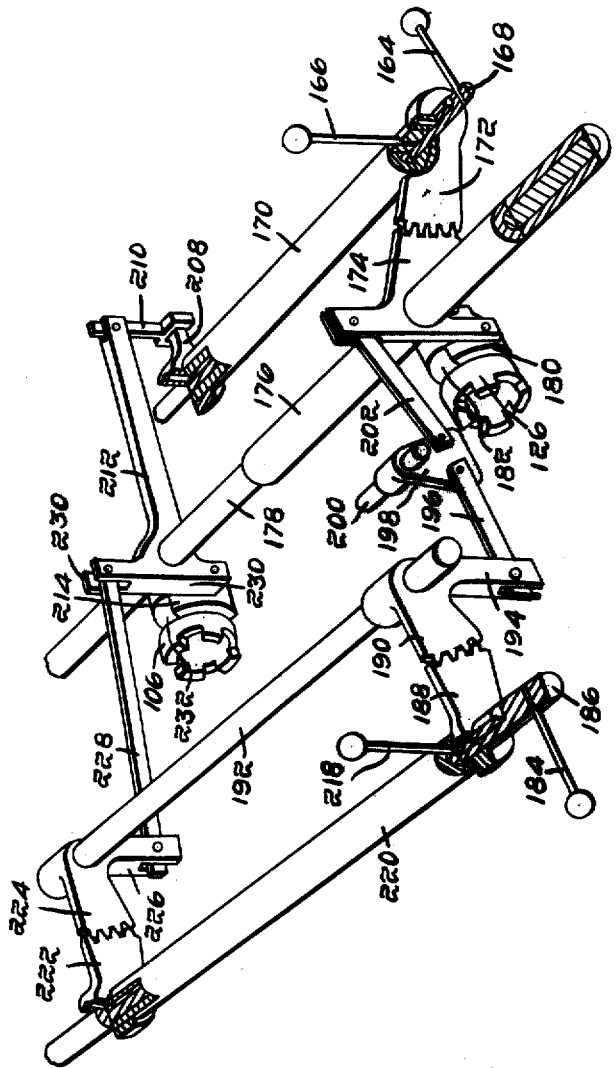

United States Patent Office 2,862,422
Patented Dec. 2, 1958

2,862,422
MILLING MACHINES

George B. Hirsch, Providence, R. I., assignor to Brown & Sharpe Mfg. Co., Providence, R. I., a corporation of Rhode Island Application November 24, 1953, Serial No. 393,989

13 Claims. (Cl. 90—21)

The present invention relates to improvements in milling machines.

The invention is herein disclosed as embodied in a milling machine of the general type having a base, a tool supporting column and a work support assembly including a vertically adjustable knee, a clamp bed or saddle adapted for forward and back adjustment on the knee, and a work supporting table mounted from the clamp bed for translatory movement. The illustrated machine is further provided with a rotatable mounting on which the table is supported for swiveling adjustment with relation to the clamp bed.

It has long been a goal of milling machine manufacturers to provide an improved arrangement of the several cooperating milling machine supports together with the driving and control devices therefor which will be more flexible and readily controlled by the operator, and which at the same time will provide a greater degree of protection for the guideways, bearings and gears against contact with coolant, flying chips, and other foreign matter.

It is a principal object of the invention to provide a novel and improved milling machine of the general type described having an improved arrangement and organization of the work support assembly including provision for the housing of the variable speed driving and branch transmissions for operating each of the knee, clamp bed and work table, whereby a relatively compact arrangement of the knee, clamp bed, and table supports is achieved which permits ready access by the operator to the work mounted on the table both from the front and from the rear of the table.

It is a further object of the invention to provide a novel and improved arrangement of the driving and control mechanisms for the knee and clamp bed providing front and rear operating stations which are readily accessible to the operator when posted at either the front or rear side of the table.

It is another object of the invention to provide an improved construction and arrangement of the several relatively movable tool and work supports which will provide a greater degree of protection for the machine ways, shaft bearings, gears and other moving parts from exposure to coolant, flying chips and foreign matter, generally.

With these and other objects in view as may hereinafter appear, a feature of the invention consists in the combination with a machine column having a tool spindle extending horizontally toward the front of the machine, of a knee vertically adjustable on ways formed on the side of the column, and a clamp bed which is supported from the knee by means of parallel forwardly extending ways, of which one way is of substantial length extending rearwardly past that side of the column having the vertical supporting ways for the knee, and a short way which is located in its entirety forwardly of the machine column.

Another feature of the invention consists in the improved construction and arrangement of the driving and control devices for the work supporting assembly including the knee, clamp bed and work table, in which the entire driving train including a source of power which may be an electric motor, the variable speed gearing and the branch transmissions for driving each of the knee, clamp bed, and table is supported from the clamp bed of the machine.

Another feature of the invention consists in the construction and arrangement of the manually operable controls for effecting both manual and power operation of the knee and clamp bed which are arranged in duplicate on the clamp bed to provide two operating stations, one at the front side of the machine and one to the rear of the work supporting table. With the construction of the machine herein described, the exterior parts of the machine including the clamp bed and the table mounted thereon, and the several manual controls which the operator is required to use for adjustment of the knee and clamp bed will always have the same relative positions chosen for the greatest degree of operator convenience and accessibility irrespective of the forward and back adjustment of the clamp bed.

Another feature of the invention consists in the construction and arrangement of the supports making up the work supporting assembly whereby the ways on the knee for the clamp bed are at all times fully covered and protected by overlying portions of the clamp bed for the entire range of forward and back movements of the clamp bed to avoid any possibility of exposure of the ways and other machine parts to coolant, chips and other extraneous matter.

The several features of the invention consist also in the devices, combinations and arrangement of parts hereinafter described and claimed which, together with the advantages to be obtained thereby, will be readily understood by one skilled in the art from the following description taken in connection with the accompanying drawings, in which:

Fig. 7 is an exploded and somewhat diagrammatic view of the driving mechanisms including branch transmissions, variable speed power driving connections, and the operating controls for the knee, clamp bed and work table;

Fig. 8 is a perspective detail view illustrating particularly the manually operated controls for effecting the power operation of the knee and clamp bed.

Figure 1:
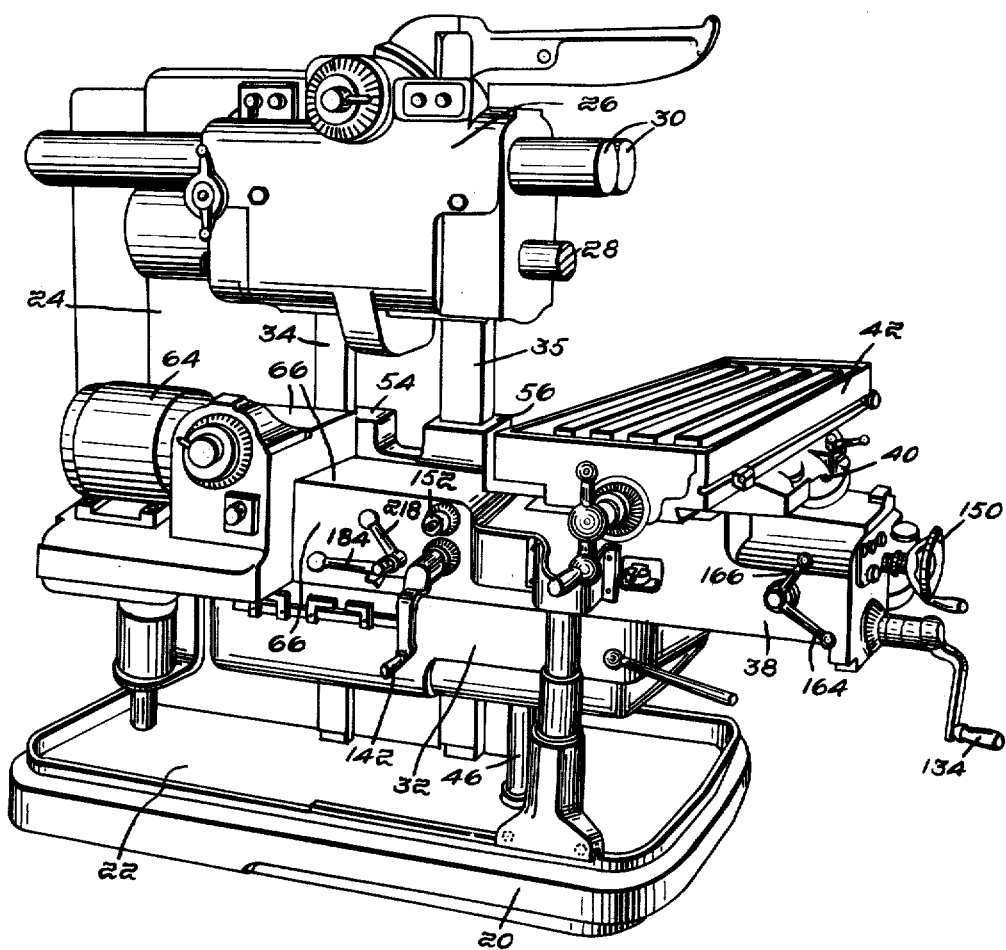
Fig. 1 is a perspective view of a milling machine embodying in a preferred form the several features of the invention.

Referring specifically to the drawings, the milling machine illustrated as embodying in a preferred form the several features of the invention comprises a base 20 having formed therein an open coolant receiving pan 22 and beneath the pan a coolant reservoir, not specifically shown. Mounted on the base is a vertically disposed column 24 having at its upper end an offset portion 26 in which is mounted a forwardly extending horizontally disposed milling cutter spindle 28 and two horizontally disposed support bars 30 which are employed in combination with an arbor support or gate, not shown, to provide additional support for the tool arbor and milling cutter.

Figure 5:
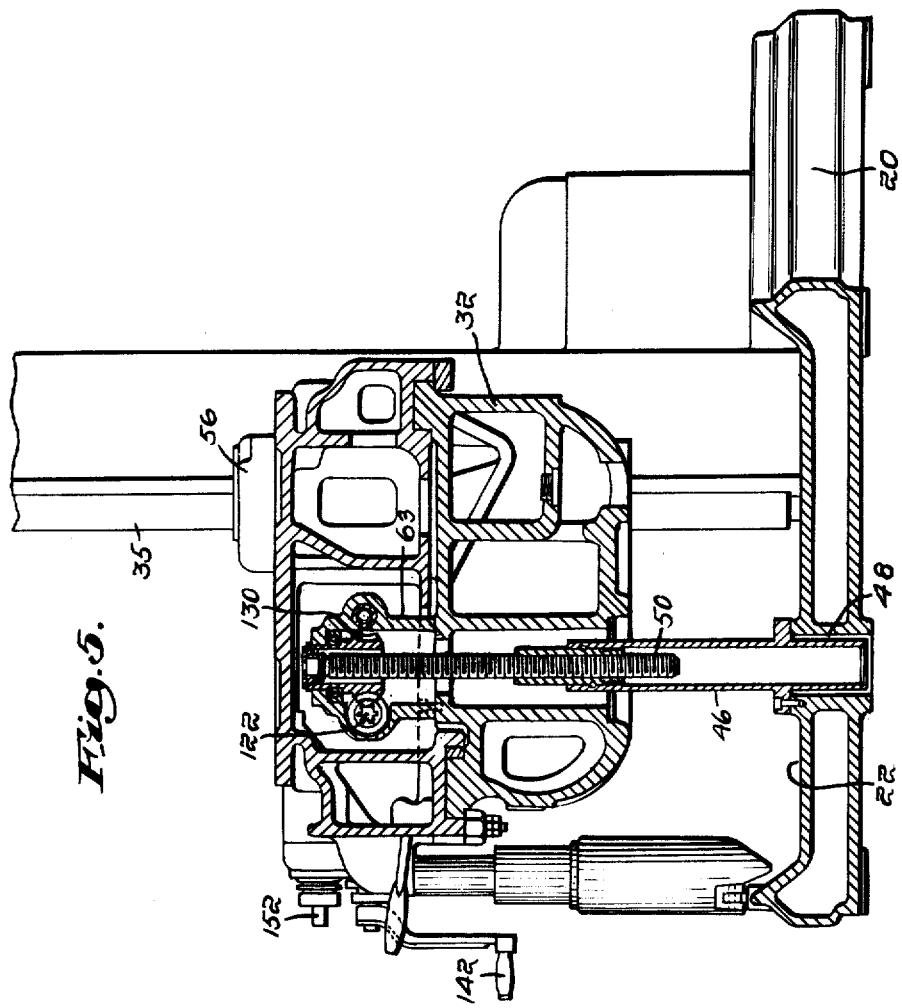
Fig. 5 is a sectional view of the machine including clamp bed, knee and base taken on the line 5—5 of Fig. 3.

The work supporting assembly of the machine comprises a knee 32 carried on vertical ways 34 and 35 formed on the left side of the column 24 beneath the offset cutter spindle housing 26. The knee 32 provides support for a clamp bed or saddle member 38 on which is mounted a swivel member 40 which in turn carries a transversely slidable work supporting table 42. The knee 32 is further supported and is adapted to be vertically adjusted by means of a vertically disposed knee elevating screw assembly which, as best shown in Fig. 5, includes an outside sleeve member 46 mounted at its lower end in a block 48 on the base and a screw and sleeve nut assembly, generally designated at 50, housed within the knee screw horn sleeve 46, and adapted to be operated either manually or by power for raising and lowering the knee.

Figure 2:
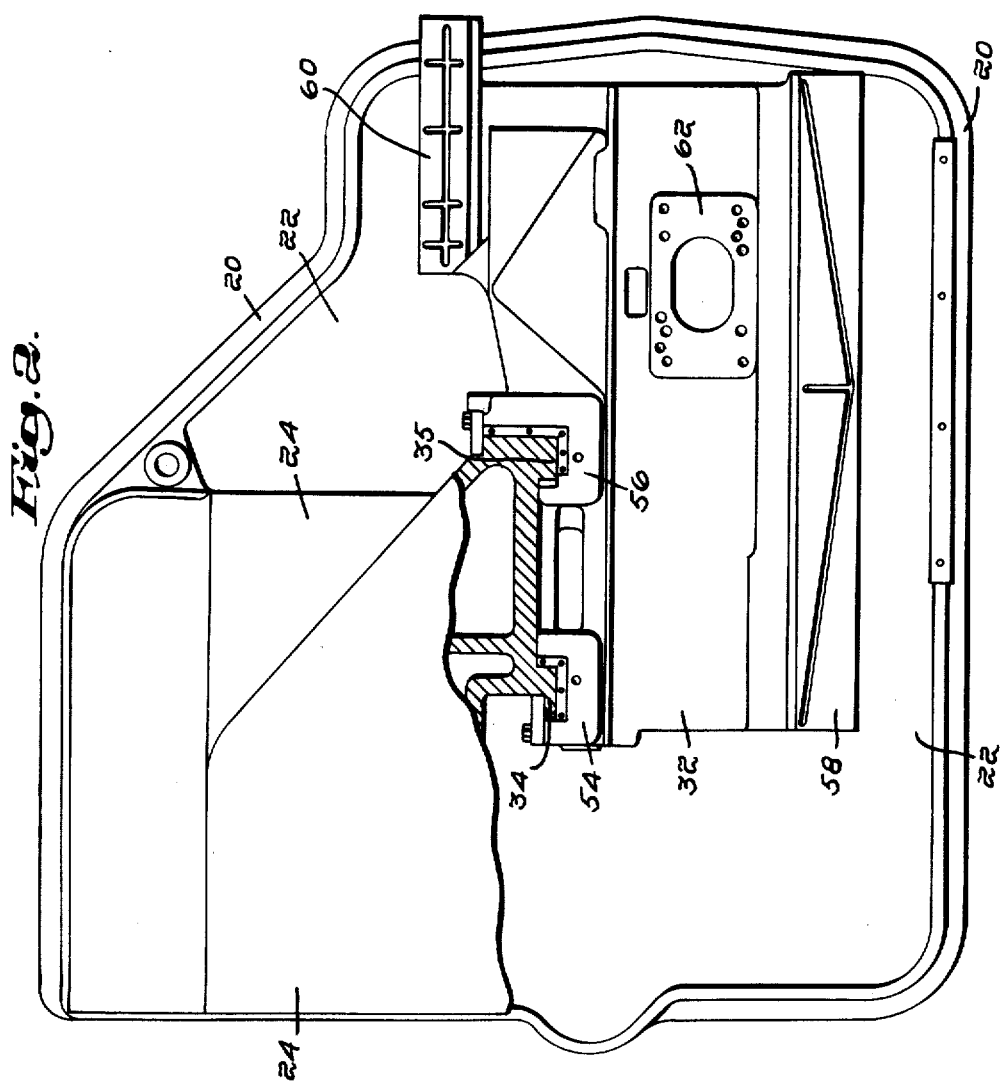
Fig. 2 is a plan view partly in section of the machine with a portion of the machine column broken away and sectioned, and with the clamp bed, swivel member and work table removed to illustrate particularly the arrangement of the knee and the vertical ways on which the knee is guided in the machine.

As best shown in Figs. 1 and 2 of the drawings, the knee 32 is generally L-shaped comprising a rearwardly extending portion formed with two vertically disposed guides 54, 56 which engage the vertical ways 34, 35. The rearward portion of the knee 32 also has formed thereon a relatively long rearwardly extending horizontal way 58 for the clamp bed 38. The way 58, as will be evident from an inspection of Fig. 2, extends from the forward end of the machine rearwardly substantially past the two vertical ways 34, 35 formed on the side wall of the column 24. At its forward end the knee 32 is provided with a lateral extension on which is mounted a second short way 60 for the clamp bed 38. A pad 62 having an oval shaped aperture therein, through which the knee elevating screw assembly 46 operates, is formed in the knee 32 and provides a mounting surface for a bracket 63 which supports the screw assembly 46. The pad 62 and elevating screw assembly associated therewith as shown in the plan view Fig. 2 are located as nearly as possible at the center of gravity of the work supporting knee, clamp bed, and work table assembly.

In accordance with the present invention the knee 32 and the clamp bed 38, mounted thereon, are constructed and arranged to provide a more efficient construction and arrangement of the work supporting assembly for use in a milling machine of the general class, herein disclosed. It will be evident from an inspection of Figs. 1, 2 and 3 of the drawings that the clamp bed 38 is formed of the same general shape as the knee 32, having a rearwardly extending portion which overlies and extends rearwardly substantially beyond the rearward portion of the knee 32 and way 58, and a lateral extending portion which overlies the short way 60. The rearward portion of the clamp bed 38, in addition to providing a complete cover the supporting way 58 for all forward and back positions of the clamp bed, is also constructed and arranged to provide support for the entire driving and control mechanism associated with the work supporting assembly. These parts including a driving motor 64, a variable feed gearing housed within a gear box 66 formed in the rearward portion of the clamp bed together with the branch gearing and controls for operating each of the knee, clamp bed and work table of the work supporting assembly provide a simple, compact assembly on the clamp bed which is highly efficient, and at the same time sufficiently removed from the working zone about the work table to greatly facilitate the work of the operator running the machine.

Figure 3:
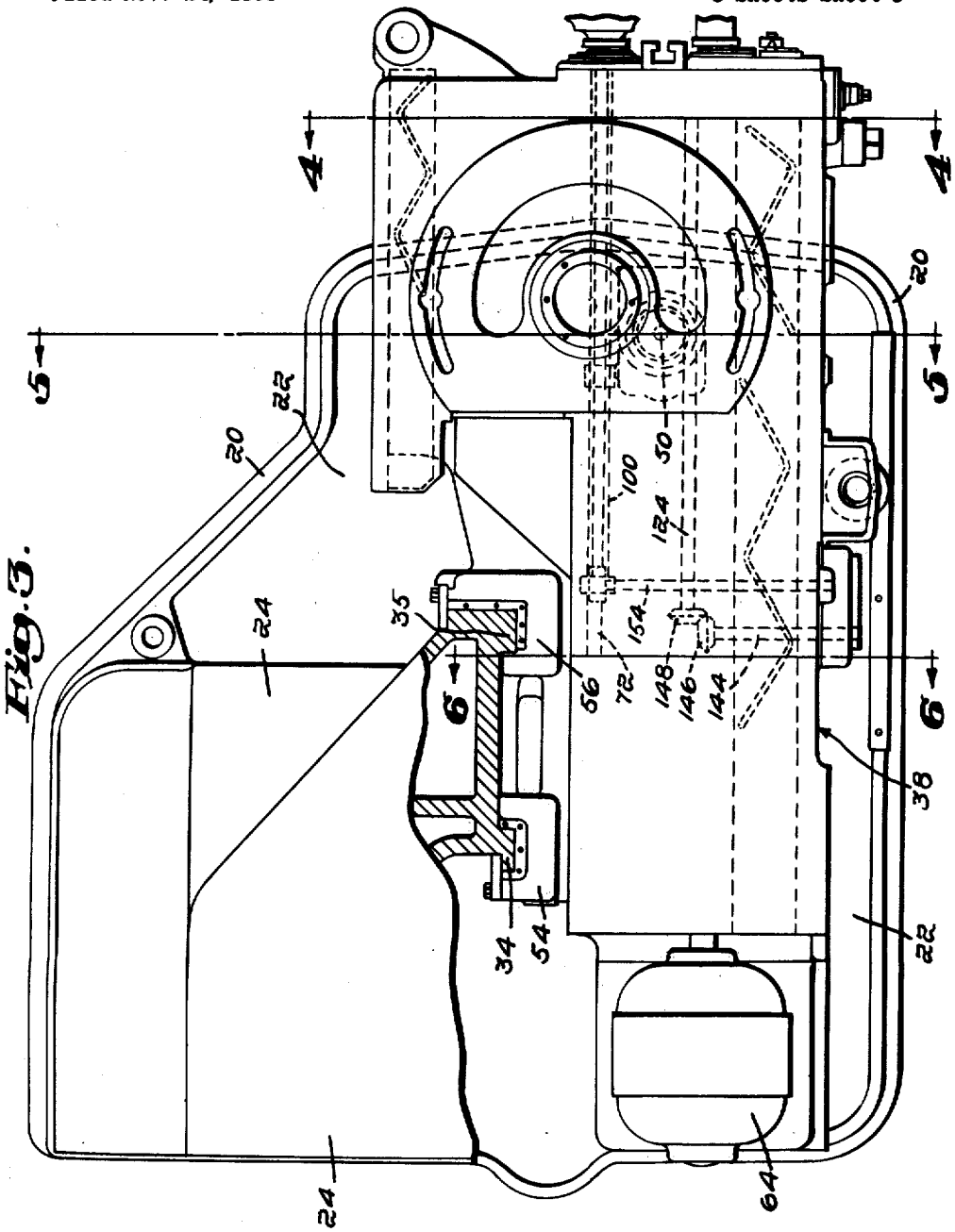
Fig. 3 is a view similar to Fig. 2 but with the clamp bed in place.

The clamp bed 38 is constructed and arranged to overlie and to provide a full protection for the ways 58, 60 for all positions of the clamp bed. As shown in Figs. 1 and 3 of the drawings the clamp bed is in a relatively advanced position, in which, however, the short way 60 and the rear end of the long way 58 both remainly fully covered by overlying portions of the clamp bed 38. Movement of the clamp bed 38 to its rear limit position similarly leaves the front ends of the two ways fully covered by the forwardly projecting end of the clamp bed.

The construction and arrangement of the driving and control devices for the knee, clamp bed and table of the work supporting assembly will be readily appreciated from an inspection of the drawings, particularly the exploded and somewhat diagrammatic views, Figs. 7 and 8. The motor 64 is connected through change speed gearing generally designated at 70 in Fig. 7 and housed within the gear box 66 on the rearward extension of the clamp bed, with a main drive shaft 72 which extends the entire length of the clamp bed forwardly. The shaft 72 is connected to drive the work table 42 by suitable bevel gear connections including a bevel gear 74 on the shaft 72 and a bevel gear 75 on a vertically disposed shaft 76 which carries a bevel gear 77 connected at opposite sides thereof to bevel driving gears 78, 80 loosely supported on a jack shaft 82 extending along the length of the table support 42 transversely of the machine. A clutch element 83 keyed to and slidable on the shaft 82 is arranged to be shifted into clutching engagement with either of gears 78, 80 to drive the shaft 82 in either direction. The shaft 82 is in turn connected by spur gears 84, 86 with a screw shaft 88 and nut 90 through which translatory movements are imparted to the table 42.

The main drive shaft 72 is also connected through suitable gearing to impart forward and back movements to the clamp bed 38 and up and down movements to the knee 32. A branch transmission is provided for driving the clamp bed which comprises a drum 92 secured to the drive shaft 72 and provided with two driving gears 94 and 96, the gear 96 being directly connected with a clutch gear 98 loosely mounted on a clamp bed actuating screw shaft 100. The gear 94 is connected to an idler gear 102 which meshes with a reverse driving clutch gear 104 also loosely sleeved on the clamp bed actuating screw shaft 100. A clutch element 106 keyed to and slidable on shaft 100 is adapted to be moved into clutching engagement with either of clutch gears 98 and 104 to drive the shaft 100 in opposite directions. A screw 108 on the shaft 100 meshes with a nut 110 which is rigidly fixed in a portion 112 of the bracket 63 of the knee 32.

A branch transmission is provided for imparting up and down movements to the knee 32 which comprises two idler gears 114 and 116 on a jack shaft 118, the gear 114 meshing with the clutch gear 98 and with a clutch gear 120 loosely supported to turn on knee drive shaft 122, and the gear 116 meshing with clutch gear 104 and with a clutch gear 124 also loosely supported to turn on the knee drive shaft 122. A clutch member 126 splined to and slidable upon the spline shaft 122 is shiftable to operatively connect the knee drive shaft 122 to be driven through the clutch gear 120 or through the clutch gear 124 alternatively in opposite directions. A worm 128 splined to the shaft 122 engages with a worm gear 130 which forms part of the screw and sleeve nut mechanism for raising and lowering the knee support.

Figure 4:
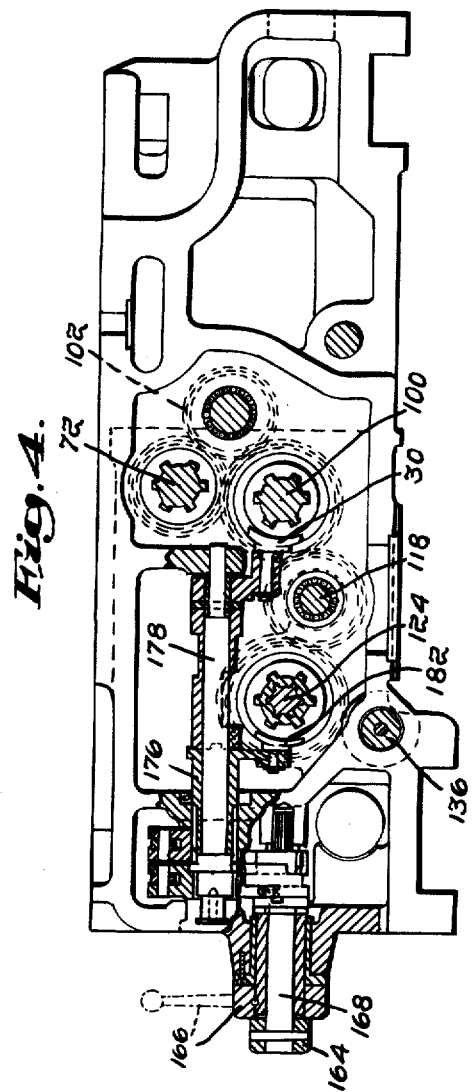
Fig. 4 is a sectional view of the clamp bed taken on the line 4—4 of Fig. 3 to illustrate particularly portions of the driving control mechanism for the clamp bed and knee carried on the clamp bed.
Figure 6:
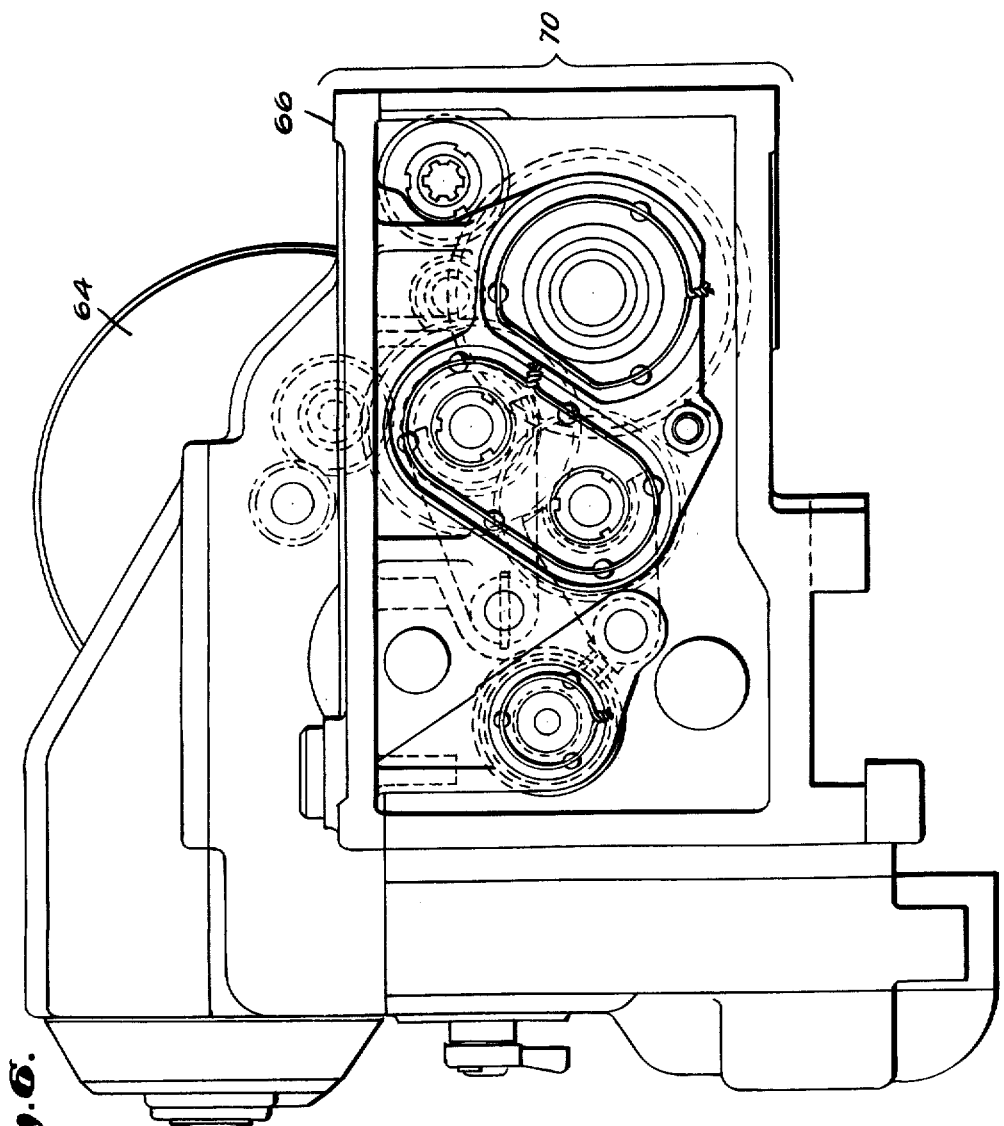
Fig. 6 is a sectional view of the clamp bed taken on a line 6—6 of Fig. 3 to illustrate particularly the change speed mechanism carried on the clamp bed.

The location of the several shafts and gears above described in the machine will be readily appreciated from an inspection of the several drawings including the plan view Fig. 3 and the associated sectional views Figs. 4, 5 and 6.

A feature of the improved machine here shown consists in the particular arrangement and location of the power and manual controls for the clamp bed and knee on the clamp bed to provide a control station at the front of the machine and a second control station accessible to the operator at the rear of the machine. In the illustrated machine all of these power and manual controls for the knee and for the clamp bed are mounted on the clamp bed of the machine. This arrangement of the controls in combination with the arrangement of all of the driving connections for these parts on the clamp bed provides a particularly accessible and efficient arrangement of the operating controls of the machine. The location of both front and rear control stations on the clamp bed has the further advantage that the controls will always occupy the same forward and back position with relation to the table and work supported thereon and are, therefore, most readily at hand for the convenience of the operator.

Referring specifically to Figs. 7 and 8 of the drawings the manual control at the front of the machine for raising and lowering the knee consists of a manually operated handle 134 supported from the clamp bed 38 at the outer end of a jack shaft 136 which is rotatably supported on the clamp bed and is connected through gears 138, 140 with the spline shaft 122. The manual control at the rear of the machine for raising and lowering the knee consists of a manually operable handle 142 carried on a cross shaft 144 which is rotatably supported on the clamp bed 38 and is connected by bevel gears 146, 148 with the rear end of the spline shaft 122. For manual operation of the clamp bed in a forward and back direction a wheel 150 is provided at the front of the machine supported from the clamp bed 38 on the forward end of the screw shaft 100 by means of which forward and back movement of the clamp bed is effected. At the rear control station of the machine a manual controller 152 is provided supported from the clamp bed 38 upon a cross shaft 154 which at its inner end has a helical gear 156 meshing with a helical gear 158 on the screw shaft 100.

The manual controls for effecting power operation of the knee and clamp bed as best shown in Figs. 1 and 8 comprise a front knee up and down controller 164 and a front clamp bed forward and back power controller 166, of which the controller 164 is secured to a transversely disposed rock shaft 168, and the vertically disposed clamp bed forward and back controller 166 is secured to a sleeve member 170 carried on the control shaft 168. With the arrangement specifically shown in Fig. 8, the shaft 168 has mounted thereon a transversely extending gear segment 172 which meshes with a gear segment 174 secured to a sleeve member 176 loosely mounted to turn on a jack shaft 178. A downward extension of the gear segment 174 is connected to a clutch shifting shoe 180 which rides in a peripheral groove 182 in the clutch element 126, above referred to in connection with Fig. 7. Power operation of the knee can be initiated also from the rear control station by means of a manual controller 184 mounted on a transversely extending control shaft 186. A rocker member 188 secured to the shaft 186 meshes with a rocker arm 190 loosely supported to turn on a jack shaft 192. A downward extension 194 of the rocker arm 190 is connected by a link 196 with a depending rocker arm 198 loosely supported on a shaft 200 and which is in turn connected by a link 202 with an upward extension 204 of the clutch shifting rocker 174.

Power movement of the clamp bed in either a forward or back direction is initiated from the front of the machine by means of the vertical controller 166 pinned to the sleeve shaft 170. An arm 208 secured to the rockable sleeve 170 is connected by a link 210 with a forwardly projecting arm 212 of a rocker member having a downwardly projecting portion thereof secured to a clutch shoe 214 which rides in a peripheral groove in clutch member 106. A manually operable power control for effecting forward and back movement of the clamp bed is provided at the rear control station of the machine in the form of a vertically disposed controller arm 218, secured to a sleeve 220 on shaft 186. A gear segment 222 secured to the sleeve element 220 meshes with a gear segment 224 free to turn on the pivot shaft 192. The gear segment 224 is formed with a downward extension 226 which is connected by a link 228 with an upwardly extending arm 230 of the rocker member 212.

The improved milling machine construction herein described and illustrated including the knee supported from the side of the tool supporting column, and the clamp bed having a forward work table supporting portion and a rearward portion and supported on a short way disposed forwardly of the machine column and a long way extending rearwardly past the knee supporting guideway at the side of the column has a number of important advantages not found or suggested by constructions of the prior art. The arrangement of the clamp bed with the rearward portion carrying the driving motor and variable speed gearing for driving the table, clamp bed and knee well removed from the operating area has fully solved the problem of locating these parts on the machine. A compact arrangement of the knee, clamp bed and table elements of the work support assembly is achieved which renders the working area of the work table, especially at the point of cutting contact, readily accessible to the operator from either the front or rear side of the table. A further advantage of applicant's improved construction consists in the arrangement of the entire driving mechanism for the table, clamp bed and knee on the clamp bed thus making possible a simplified and most efficient arrangement of the driving connections including the branch transmissions and of the manually operable manual and power controls for moving these parts. The illustrated arrangement of the clamp bed and of the driving mechanism supported thereon has the further specific advantage that both the front and rear operating stations, provided by duplicate manual controls for the clamp bed and knee, are in each instance mounted on the clamp bed so that they have the same relative positions with respect to the operating area from both the front and rear sides of the work table, and are therefore always conveniently at hand to the operator irrespective of the forward or rearward adjustment of the clamp bed or knee elevation. The combination of the knee supported from the side of the column with the clamp bed carried on one short way forwardly of the column, and a long way extending rearwardly past the knee ways provides a sturdy, well-balanced construction in which the weight of the several component parts of the assembly is most efficiently distributed in that the motor, change speed gearing and branch transmissions for the table, clamp bed and knee are mounted between the two ways. A further distribution of weight over the surface area of the clamp bed ways is effected by the rearward location of the motor and change speed gearing which balances at least in part the weight of the forwardly located work table and the thrust of the milling cutter thereon. A further advantage of the illustrated construction consists in the fact that all of the moving parts of the driving mechanism for the work support assembly including the variable speed gearing and branch transmissions together with the ways for the clamp bed, are housed within the clamp bed, and are at all times fully protected from coolant, and from the accumulation of chips and dirt incidental to the operation of the machine.

Features of the illustrated machine, which relate more specifically to the collection and return of coolant to the coolant reservoir provided in the base of the machine, form the subject matter of a separate application for Letters Patent in the United States Patent Office to Graves, Serial No. 352,233, filed on April 30, 1953 for Coolant Return System and now Patent No. 2,770,172.

The invention having been described what is claimed is:

1. In a milling machine having a machine base, a tool supporting column mounted from said base having vertically disposed knee supporting ways formed on one side of said column, and a clamp bed supported table mounted forwardly of said column, the combination of a knee having a portion thereof disposed forwardly from said column and a rearward portion disposed at the side of said column with and supported by said ways, means for effecting vertical adjustment of said knee with relation to said base and column, long and short horizontally disposed clamp bed supporting ways extending rearwardly on said knee, of which said short way is disposed in front of said machine column and said long way is disposed at that side of said machine column with the vertical supporting ways for said knee, a clamp bed having forward and rearward portions overlying respectively said forward and rearward portions, of the knee.

2. In a milling machine having a machine base, a tool supporting column mounted from said base having vertically disposed knee supporting ways formed on one side of the column, and a bed supported table mounted forwardly of said column, the combination of a knee having a portion thereof disposed forwardly of said column and a rearward portion disposed at the side of said column with and supported by said ways, a knee elevating screw assembly further supporting said knee from said base and providing for vertical adjustment of said knee on its ways, long and short horizontally disposed clamp bed supporting ways extending rearwardly on said knee of which said short way is disposed in front of said machine column and said long way extends rearwardly on said rearward portion of the knee past said vertical supporting ways for said knee, a clamp bed having forward and rearward portions overlying respectively said forward and rearward portions of said knee and adapted for forward and back adjustment on said clamp bed supporting ways on said knee.

3. In a milling machine the combination of a machine base, a tool supporting column mounted from said base having a tool head offset laterally from said column with a forwardly extending tool spindle, and with vertically disposed knee supporting ways formed on the side of said column with the tool head, a knee having a portion thereof disposed forwardly of said machine column and a rearward portion thereof lying adjacent to and supported from said ways, a knee elevating screw assembly further supporting said knee from said base and providing for vertical adjustment of said knee on its ways, long and short horizontally disposed clamp bed supporting ways extending rearwardly of said knee of which said short way is disposed in front of said machine column and said long way extends rearwardly on said rearward portion of the knee past said vertical supporting ways for said knee, a clamp bed having forward and rearward portions overlying respectively said forward and rearward portions of said knee and adapted for forward and back adjustment on said clamp bed supporting ways on said knee, and a work table supported from said forward portion of the clamp bed for translatory movements thereon.

4. In a milling machine having a machine base, a tool supporting column mounted from said base having vertically disposed knee supporting ways formed on one side of said column, and a clamp bed supported table mounted forwardly of said column, the combination of a knee having a portion thereof disposed forwardly from said column and a rearward portion disposed at the side of said column with and supported by said ways, means for effecting vertical adjustment of said knee with relation to said base and column, long and short horizontally disposed clamp bed supporting ways extending rearwardly on said knee, of which said short way is disposed in front of said machine column and said long way extends rearwardly on said rearward portion of said knee adjacent said vertical supporting ways for said knee, a clamp bed having forward and rearward portions thereof overlying respectively said forward and rearward portions of the knee and further constructed and arranged for all positions of forward and back adjustment of said clamp bed to fully cover said long and short ways.

5. In a milling machine having a machine base, and a tool supporting column mounted from said base, the combination of a work support assembly including a long and a short horizontally disposed clamp bed supporting way mounted from said base and extending rearwardly of the machine, of which said short way is disposed in front of said machine column and said long way extends rearwardly at one side of said column, and a clamp bed adapted for forward and back movements on said ways constructed and arranged to fully cover said ways for all positions of forward and back adjustment of said clamp bed.

6. In a milling machine the combination of a machine base, a tool supporting column mounted from said base, a work support assembly including a knee vertically adjustable with relation to said column, a clamp bed carried upon and arranged for forward and back movement on said knee, a table supported from said clamp bed for movement in a direction generally transverse to the forward and back movement of said clamp bed, and manual and power operated devices for imparting movement to each of said knee and clamp bed including duplicate manually operable clamp bed horizontal controllers mounted on said clamp bed at the front and rear side of said table and connections therefrom operative to impart forward and back movement to said clamp bed, and duplicate manually operable vertical controllers mounted on said clamp bed at the front and rear side of said table and connections therefrom operative to effect vertical movements of the knee said controllers providing front and rear operator control stations which are always in a fixed position relative to said transverse movement of said table.

7. In a milling machine the combination of a machine base, a tool supporting column mounted from said base, a work support assembly including a knee vertically adjustable with relation to said column, a clamp bed carried upon and arranged for forward and back movement on said knee, a table mounted from said clamp bed for movement in a direction generally transverse to the forward and back direction of movement of said knee, transmission means actuating each of said clamp bed and knee, power means acting when rendered operative for driving said transmissions, duplicate manually operable controls mounted on the clamp bed at opposite sides of said table providing front and rear operator control stations, and connections from said manual controllers for effecting the alternative manual and power operation of each of said transmissions and of said clamp bed and knee actuated thereby said operator control stations providing fixed operator control station positions relative to said transverse movement of said table.

8. In a milling machine the combination of a machine base, a tool supporting column, a work assembly including a knee adjustable vertically with relation to said column, a clamp bed carried upon and arranged for forward and back movement with relation to said knee, a table mounted from said clamp bed for movement in a direction generally transverse to the forward and back direction of movement of said knee, and driving and control devices for said knee and clamp bed including transmission devices originating on said clamp bed for effecting each of said movements, front and rear manual control stations for effecting said movements of said knee and clamp bed including manual controls supported from knee clamp bed rearwardly of said table for effecting alternative manual and power movement of said clamp bed in a forward and back direction and movement of said knee in a vertical direction whereby said front and rear manual control stations are always in fixed position relative to said transverse movement of said table.

9. In a milling machine the combination of a machine base, a tool supporting column, a work support assembly including a knee adjustable vertically with relation to said column, a clamp bed carried upon and arranged for forward and back movement with relation to said knee, a table mounted from said clamp bed for translatory movement relative thereto, and driving and control devices for effecting vertical movements of said knee and forward and back movements of said clamp bed including a power source and transmissions therefrom originating on said clamp bed for effecting said vertical and forward and back movements of said knee and clamp bed, and manually operable control devices for said knee and clamp bed including manual knee vertical operating controls mounted on said clamp bed at each of the front and rear sides of said table, providing front and rear operator control stations which are always in fixed position relative to said translatory movement of said table.

10. In a milling machine having a machine base, a tool supporting column mounted on said base, and vertically disposed knee supporting ways formed on one side of said column, the combination of a work support assembly including a knee having a main portion thereof disposed forwardly of said machine and a rearward portion thereof disposed at the side of said column with said ways and supported thereby, a knee elevating screw assembly supporting said knee from said base, long and short rearwardly extending clamp bed ways on the upper face of said knee, of which the short way is disposed in front of said machine column, and said long way is disposed at that side of said column with said vertical supporting ways for said knee, a clamp bed having main and rearward portions thereof overlying the respective main and rearward portions of said knee for forward and back movement of said ways, a table supported from the main portion of said clamp support for translatory movement, and driving and control devices for said work assembly including a power source and connections originating from said clamp bed for moving said knee and clamp bed, and a plurality of operating stations comprising duplicate manual and power controllers supported on said clamp bed at the front and rear sides of said table for effecting said vertical knee and forward and back clamp bed movements.

11. In a milling machine having a machine base, and a tool supporting column mounted from said base having vertically disposed knee supporting ways formed on one side of said column the combination of, a knee having a work load supporting portion thereof disposed forwardly from said column and a rearward portion disposed at the side of said column with and supported by said ways, means for effecting vertical adjustment of said knee with relation to said machine base and column, long and short horizontally disposed clamp bed supporting ways extending rearwardly on said knee, of which the short way is disposed in front of said machine column, and said long way is disposed at that side of said machine column with said vertical supporting ways for the knee, a clamp bed having forward and rearward portions overlying respectively the forward and rearward portions of said knee, a work supporting table mounted from said clamp bed, and driving and control devices including an electric motor and variable speed gearing therefrom mounted on said rearward portion of said clamp bed and transmission means therefrom for actuating each of said clamp bed and knee, and manually operable controls mounted on said clamp bed for effecting alternative manual and power operation of each of said transmission means and of said clamp bed and knee actuated thereby.

12. In a milling machine having a machine base, and a tool supporting column mounted from said base having vertically disposed knee supporting ways formed on one side of said column, the combination of, a knee having a work load supporting portion thereof disposed forwardly from said column and a rearward portion disposed at the side of said column with and supported by said ways, means for effecting vertical adjustment of said knee with relation to said machine base and column, long and short horizontally disposed clamp bed supporting ways extending rearwardly on said knee, of which said short way is disposed in front of said machine column, and said long way is disposed at that side of the machine column with the vertical supporting ways for the knee, a clamp bed having forward and rearward portions overlying respectively the forward and rearward portions of said knee, a work supporting table mounted from said clamp bed, and driving and control devices including an electric motor variable speed gearing, and transmission means from said motor for actuating each of said table, clamp bed, and knee supported between said long and short ways on said clamp bed.

13. In a milling machine having a machine base, and a tool supporting column mounted from said base having vertically disposed knee supporting ways formed on one side of said column, the combination of, a knee having a work load supporting portion thereof disposed forwardly from said column and a rearward portion disposed at the side of said column with and supported by said ways, means for effecting vertical adjustment of said knee with relation to said machine base and column, long and short horizontally disposed clamp bed supporting ways extending rearwardly on said knee, of which said short way is disposed in front of said machine column, and said long way is disposed at that side of said machine column with the vertical supporting ways for said knee, a clamp bed having forward and rearward portions overlying respectively the forward and rearward portions of said knee, a work supporting table mounted from said clamp bed, and driving and control devices including an electric motor variable speed gearing from said motor mounted on said rearward portion of said clamp bed between said long and short ways, and transmission means from said variable speed gearing for actuating each of said table, clamp bed, and knee carried on said clamp bed between said long and short ways.

References Cited in the file of this patent

UNITED STATES PATENTS

| 1,480,901 | Graves | Jan. 15, 1924 |
| 2,007,314 | Stuhlmacker | July 9, 1935 |
| 2,416,539 | Nenninger et al. | Feb. 25, 1947 |
| 2,462,997 | Roush | Mar. 1, 1949 |
| 2,483,451 | Armitage et al. | Oct. 4, 1949 |

FOREIGN PATENTS

| 397,430 | Great Britain | Aug. 24, 1933 |